Aug. 14, 1928.  
J. B. GAIL ET AL  
WATER PURIFIER  
Filed April 11, 1921  
1,680,867  
6 Sheets-Sheet 5
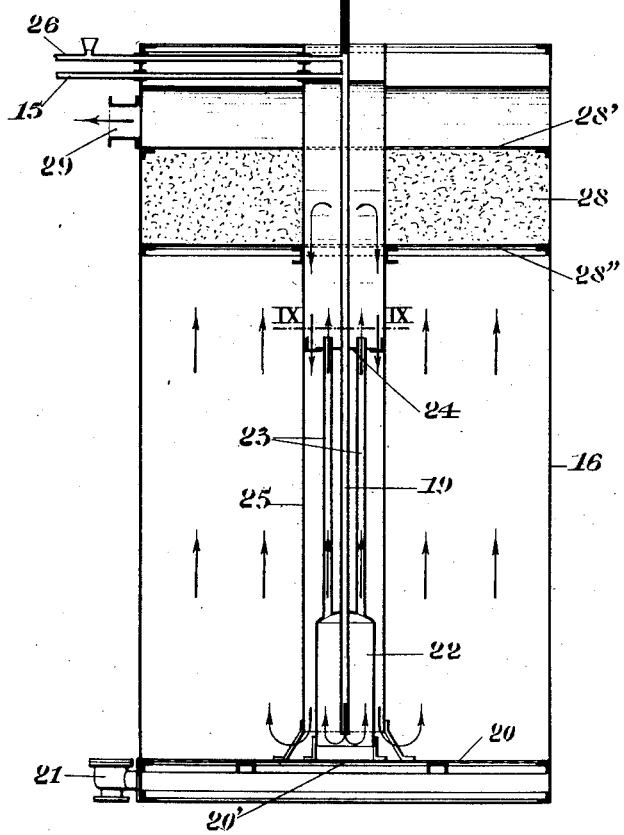

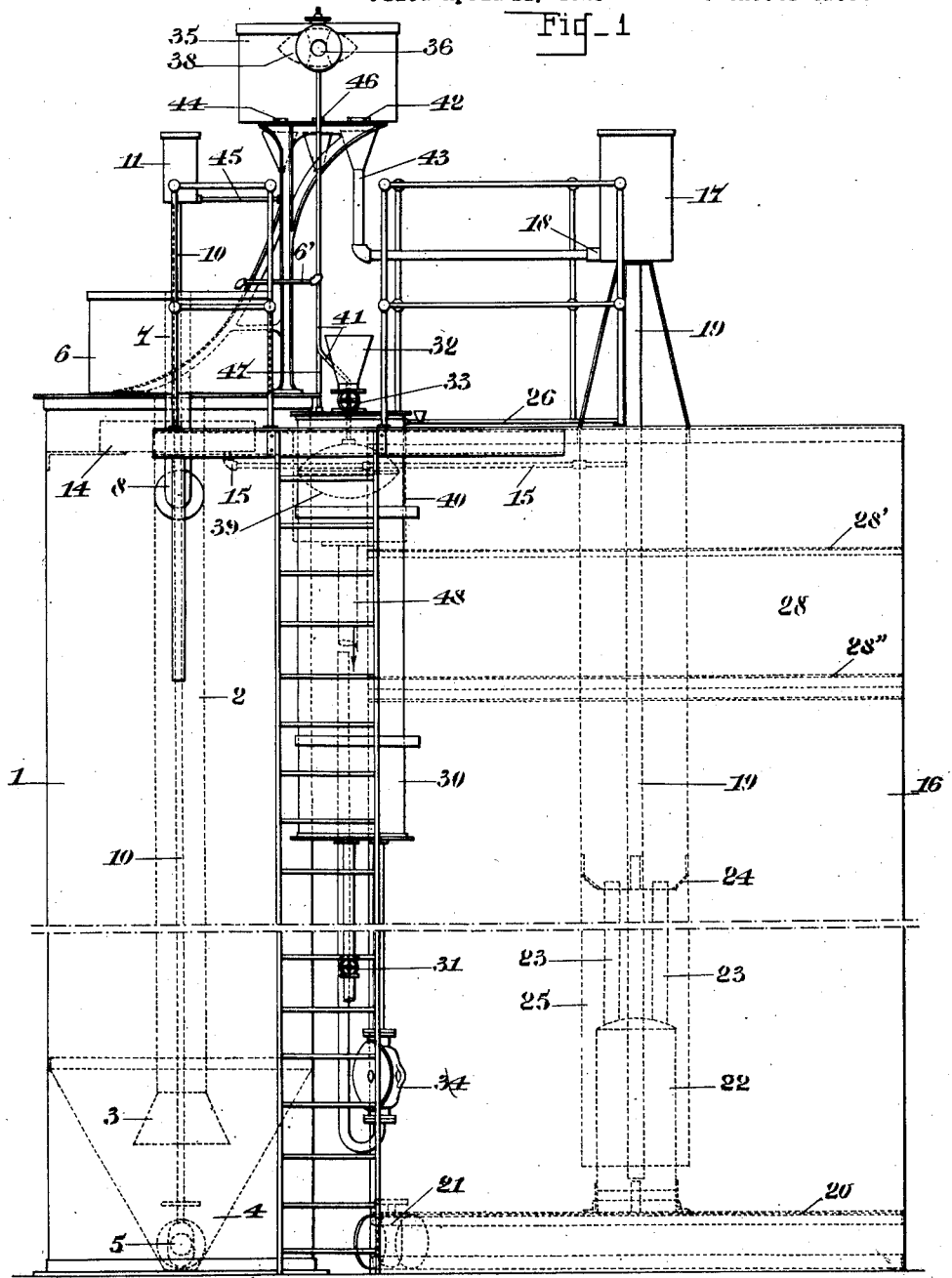

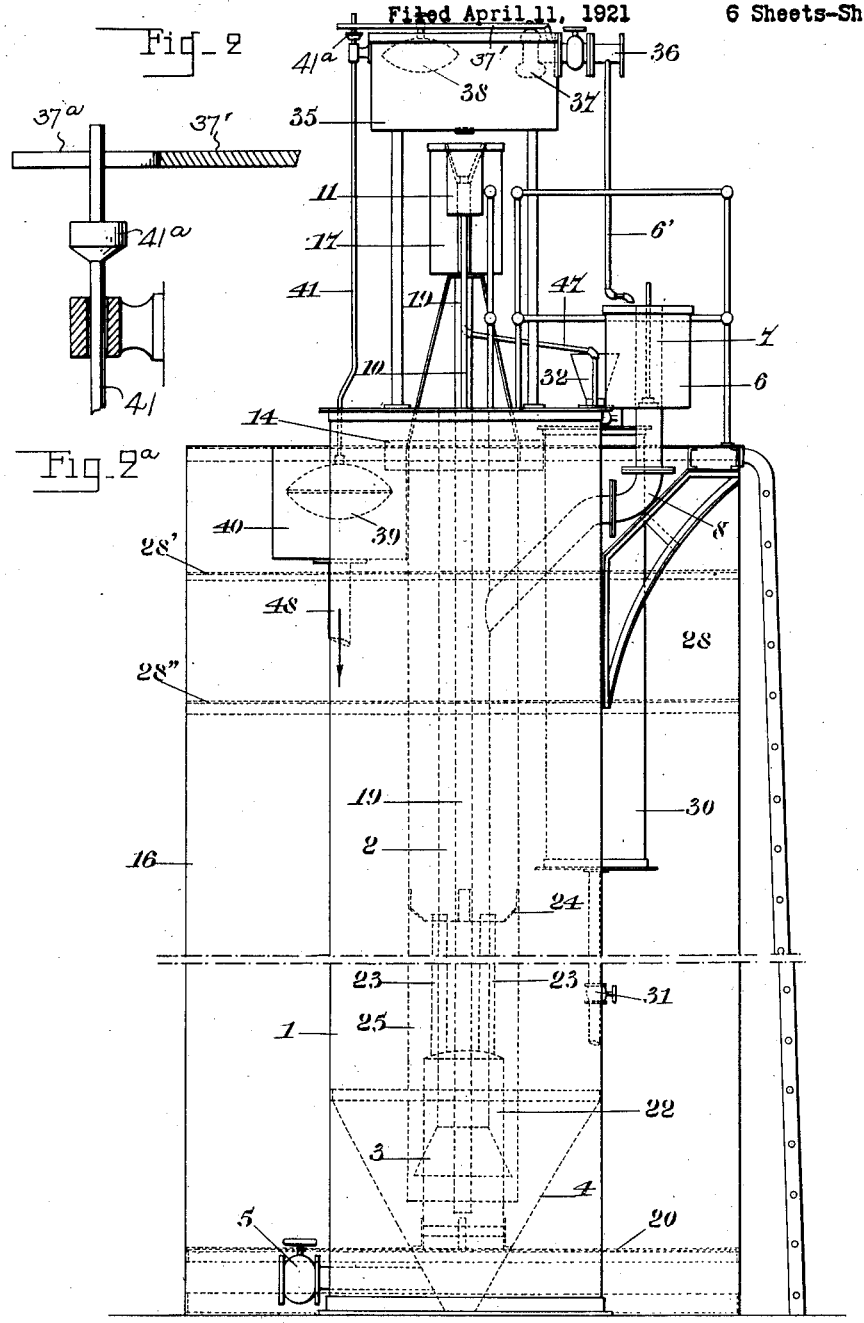

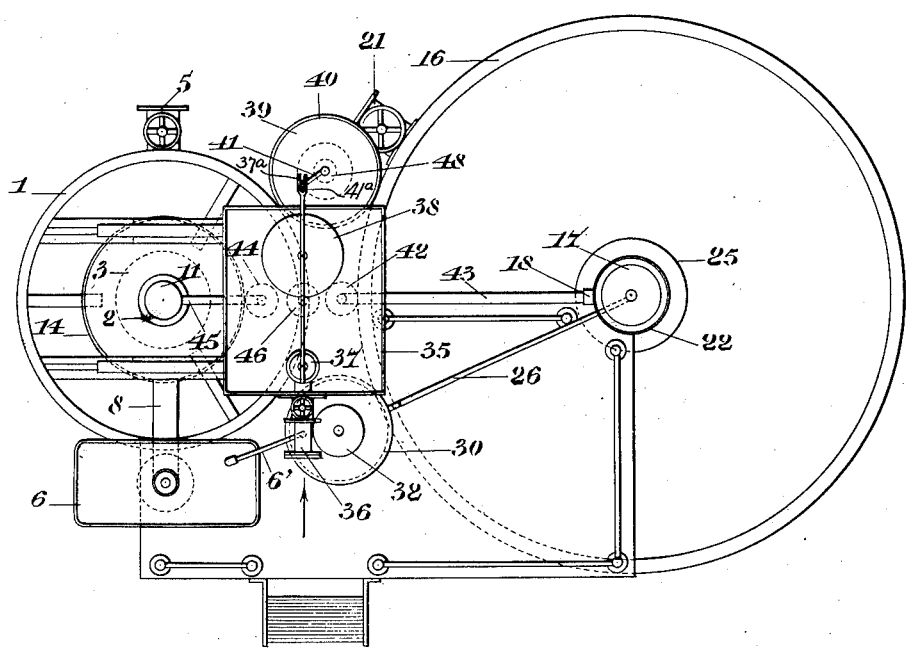

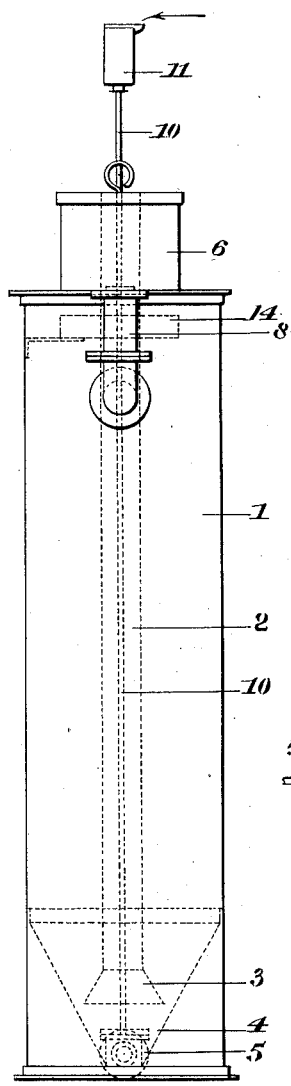
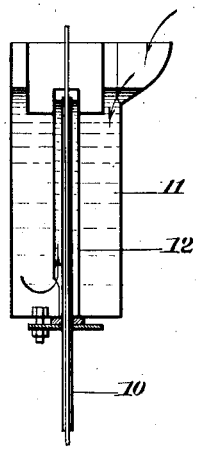
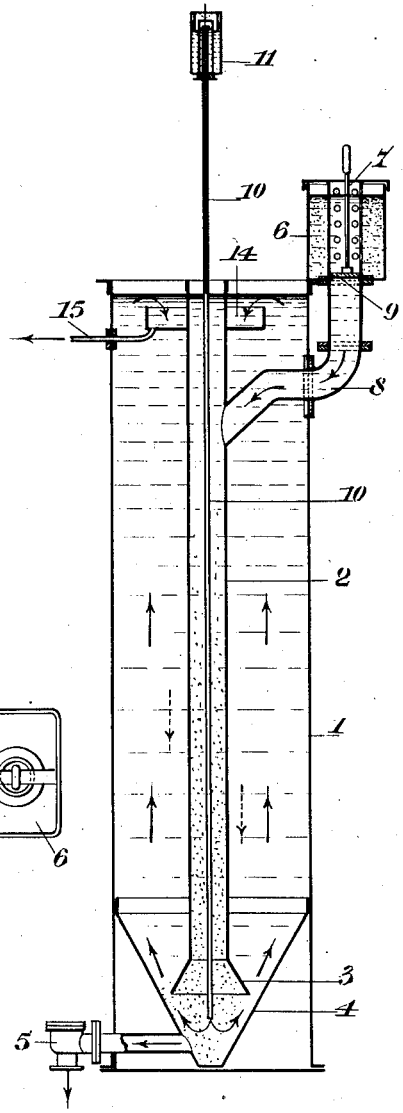
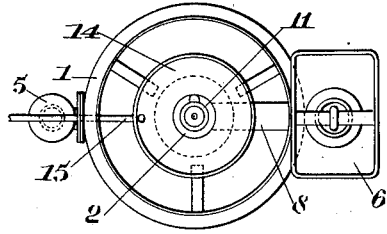

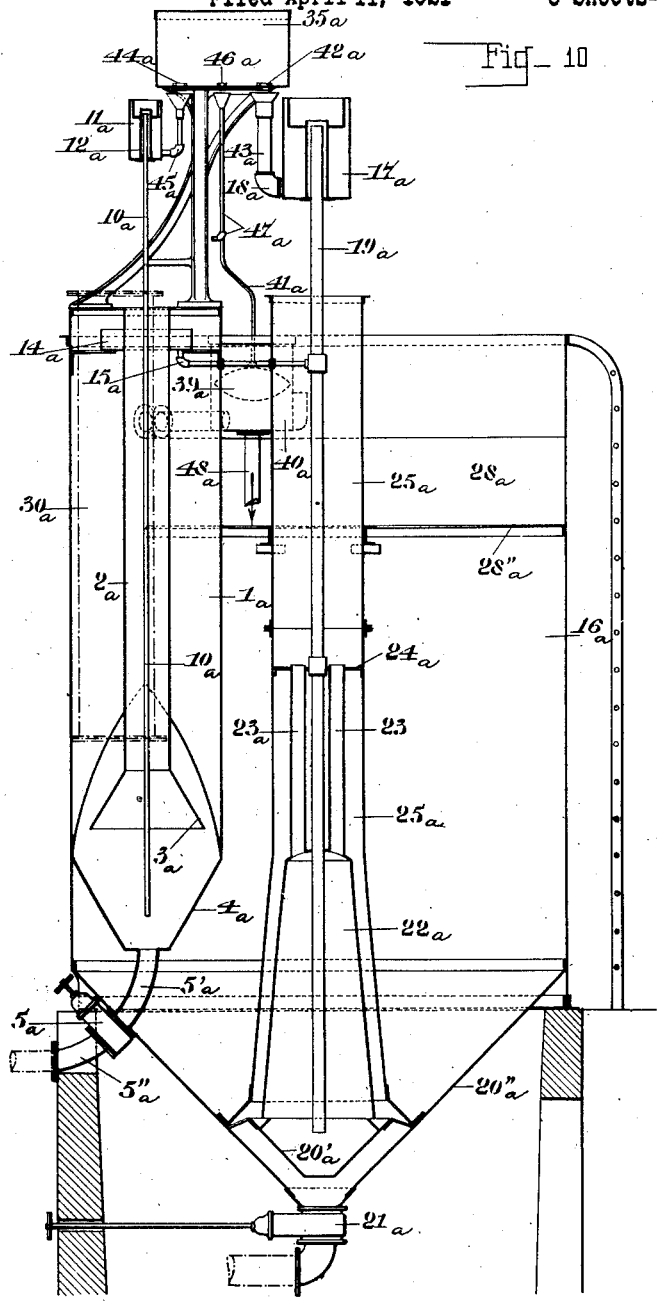

Patented Aug. 14, 1928.

1,680,867

UNITED STATES PATENT OFFICE.

JEAN-BAPTISTE GAIL AND NOËL ADAM, OF PARIS, FRANCE.

WATER PURIFIER.

Application filed April 11, 1921, Serial No. 460,586, and in France April 15, 1920.

This invention has for its object to provide an improved water purifier for carrying into practical effect the known water purifying process comprising the use of lime water with or without the addition of other reagents.

In the case of river water or well water intended for feeding boilers or even for domestic purposes, carbonate of soda is usually employed as a second reagent. In the case of industrial waste liquors, or waters, sewage and drain water in general, there is usually employed together with the lime water, aluminium sulphate or ferric sulphate, or even iron perchloride. All existing plants employed for carrying into effect the process above referred to, comprise moving mechanical parts serving either for the reception of the crude water and for distributing it to the different parts of the apparatus, or for agitating the mud in the decanting apparatus.

The improved automatic apparatus forming the subject matter of the present invention comprises, on the contrary, no mechanical agitating device whatever and therefore is altogether stronger and simpler than former devices.

The improved purifier provides for preparing the reagent (for instance lime and soda) for regulating the discharge of the water to be purified and of the reagents, and finally of decanting the purified water.

For the purpose of facilitating the description of the improved apparatus, reference is made to the accompanying drawings wherein:

Fig. 1 is a front elevation of the apparatus as a whole.

Fig. 2 is an elevation corresponding to Fig. 1 taken at an angle 90° relatively to the latter.

Fig. 2ª is a detail on an enlarged scale of a part of Fig. 2.

Fig. 3 is a plan corresponding to Fig. 1.

Fig. 4 is an elevation of the device for saturating water with lime.

Fig. 5 is a vertical section corresponding to Fig. 1, assumed to be turned through 90° to the right.

Fig. 6 is a plan corresponding to Fig. 5.

Fig. 7 is a detailed view drawn to a larger scale, of the feeding siphon tank.

Fig. 8 is a vertical section of the decanting device.

Fig. 9 is a plan view of a detail of Fig. 8.

Fig. 10 is a vertical section of a modified construction of the improved apparatus. In this modification the saturator has been lodged inside the decanter above which distributing parts are brought together.

Fig. 11 is a detail on an enlarged scale of one of the diaphragms and its associated parts.

The apparatus according to the present invention (Figs. 1, 2, 3 and 8) comprises a cylindrical decantation apparatus 16 receiving firstly the crude water to be purified which is supplied by means of a tank 35 provided with feed regulating devices, and secondly the milk of lime supplied by a saturating apparatus 1. There is also provided an auxiliary tank 30 for the introduction of a certain quantity of carbonate of soda.

These various elements will be successively described.

The decanting vessel comprises a cylindrical vessel 16 combined with a tank 17 which receives the water to be purified that is supplied by the pipe 43 communicating with the distributing tank 35.

The tank 17 contains a siphon apparatus which is identical with the one contained in the tank 11 of the saturator shown in Figure 7 and operates in the same manner, that is to say it empties the tank 17 at each period of working, the liquid discharging through the pipe 19.

As shown in Figure 7 the siphon comprises an exterior tube 12 in open communication at the bottom with a tank 11, and closed at the top, and in this first tube another vertical tube 10ª is positioned, open at its top adjacent the upper end of the outer tube, and having its lower end in communication with atmosphere below said tank.

The decanting vessel 16 is provided with a false bottom 20 having uniformly distributed orifices and receiving the deposits which are discharged through a valve 21 as hereinafter described.

The central portion 20′, Fig. 8, of the false bottom 20 is not perforated and supports a bell 22 into which the lower part of the pipe 19 opens. This bell carries at its upper part mixing tubes 23 whose ends open above the plate 24 which carries them, and whose diameter is approximately equal to that of the bell 22. This plate and the bell are surrounded by a tube 25 which opens close to the false bottom 20 and extends through the entire height of the apparatus.

The reagents such as the lime water and the solution of carbonate of soda, or any other reagents that are necessary in view of the composition of the water to be purified, are conveyed to the pipe 19 by way of the pipes 15 and 26.

Near its upper part the decanting vessel 16 is provided with a filter 28 arranged between two perforated plates 28' and 28'' above which is situated the exit 29 leading to the chamber 40.

The purified water is discharged by way of the auxiliary chamber 40 and outlet pipe 48 to the point of consumption. The discharge of the water is regulated as follows:

At the upper part of the apparatus is disposed a small vessel 35, mounted upon two light cast iron supports; and water is supplied thereto by means of the piping 36 and the valve 37, which is controlled by a float 38 disposed in the vessel 35 and regulating the inflow according to needs.

A second float 39 disposed in the discharge tank 40 for the purified water also acts upon the valve 37, by means of the guided rod 41, when the output required of the apparatus is below its normal rate of discharge.

When the water level rises in the discharge chamber 40 the float 39 is raised, the rod 41 which carries an abutment 41ª transmits the movement of the float by means of the stem 37' terminating in the form of a fork 37ª to the valve 37 by which the delivery is thus automatically regulated.

The output of water to be purified is regulated by means of an orifice pierced in a brass diaphragm 42 located at the bottom of the tank 35. The pressure which is maintained constant in this tank remains invariable upon the said orifice which, being predetermined, furnishes a constant outflow. This water to be purified flows off through a pipe 43 on its way to the decanting device hereinafter described.

The water which is to be converted into lime water flows out through the orifice 44 and passes through the pipe 45 into the siphon tank hereinbefore referred to. This orifice 44 is arranged like the orifice 42 and it is determined in such a manner as to allow under the same pressure as the latter the outflow of the volume of lime water that is necessary for the purification of the water supplied by the said orifice 42.

The quantity of lime water flowing out through the pipe 15 in order to be mixed with the crude water treated in the decanting device 16, is always equal to the flow through the pipe 45.

46 is a third orifice likewise arranged at the bottom of the tank 35, and under the same head as that on the orifices 42 and 44, which always allows of the flow of a very small quantity of water equal to the quantity of the solution of carbonate of soda from the tank 30 that is to be mixed with the water to be purified.

This flow passes to the tank 30 through a pipe 47, and displaces an equal volume of the solution contained in the said tank, which volume passes to the decanting device 16.

The saturating device, which is shown in detail in Figs. 5, 6 and 7, comprises a vertical cylindrical reservoir 1 enclosing an internal central tube 2, the lower part 3 of which is preferably of flaring shape. The bottom 4 of the cylinder 1 is of conical shape and communicates at this part with the tube 2. This bottom 4 is further fitted with a cock 5 by means of which the saturator 1 can be emptied. This cock may be replaced by a valve fitted at the apex of the conical bottom.

On the upper part of the saturator 1 there is located a round tank 6 furnished at its centre with a perforated vertical tube 7 communicating by a duct 8 with the central tube 2 of the saturator.

A bottom plug 9 is provided in the lower part of the perforated tube 7 at the entrance of the duct 8.

A vertical tube 10 located in the axis of the saturator has its lower end opening close to the bottom of the latter. At its upper part this tube rises up to the level of a tank 11, inside of which there is provided a siphon 12 which discharges through the tube 10.

As will be seen from the description, the water for feeding reservoir 11 flows through pipe 45 the outlet of which is above that of the siphon 12. As a result of this, the siphon when operating, empties the reservoir 11, upon which it becomes inoperative and permits entrance of air into the tube 10, and the siphon only comes into operation again when the water level in reservoir 11 reaches the level of the top of the siphon.

The saturator is fed with water from this siphon tank 11 as hereinafter set forth.

The operation of the apparatus thus constructed is as follows:

The lime which has been slaked in the tank 6 that is fed with water through the pipe 6', passes out in the form of milk of lime through the duct 8 which conveys it to the tube 2. It has a tendency to sink to the bottom of the saturator through the conical portion 4 of the tube 2 but it is maintained at this space by the current of water coming from the siphon 12.

The intermittent inflow of this water which takes place at very short intervals effects an agitation of the milk of lime in this part of the apparatus and this agitation is further intensified by the eddies caused by the air which is carried over into the lower part of the tube 10 at each discharge of the siphon.

The air thus carried to the bottom of the saturator breaks loose and escapes to the upper part, thereby producing a certain amount of eddying in the tube 2, thus maintaining in suspension the lime (that has a tendency to sink to the bottom of the saturator) and thus assuring the saturation of the water.

Finally, after the siphon has been stopped, and the discharge of the tube 10 has ceased, there takes place a sudden inrush of water charged with lime into the lower part of this tube, thus producing violent eddying. In this manner, by these three means, there is effected an energetic and regular stirring of the particles of lime in the water, thereby effecting the saturation.

It is, by the way, important to note here that the different actions that contribute for effecting the aforesaid agitation take place exclusively in the interior space of the tube 2 and in its flaring lower portion, leaving at rest the annular space comprised between the cylinder 1 of the tube 2.

The saturated water then passes under the tube 2 and enters the aforesaid annular space in the interior of which it rises slowly in the direction indicated by the arrows. It thus becomes freed gradually by settlement from the caustic lime which it has carried over in excess and in suspension, as well as from the carbonate of lime formed by the mixture of the lime and the water or contained in the lime as an impurity.

The lime water thus arrives in a clear and completely saturated state at the upper part of the tube I where it flows over into a tray 14 from which it flows off through a tube 15 on its way to the decanting device as hereinafter described.

While a certain quantity of lime is used for saturating the water in the improved apparatus, another quantity remains in the tank 6 where it becomes slaked so that it is ready for use when the first quantity has been completely used up. By this means stones and unslaked portions of lime are prevented from reaching the lower part of the apparatus.

The preparation of the second reagent, which may be, for instance, carbonate of lime, is effected in the following manner:

The carbonate of soda is dissolved in a tank 30 (Figs. 1 and 2) so as to produce a more or less concentrated solution.

To prepare this solution, a certain quantity of liquid is withdrawn by means of the lower cock 31 from the tank 30 and into the latter there is introduced the necessary addition of carbonate of soda for a 12-hours working.

This solution is poured into the tank 30 by way of the upper funnel 32 and the cock 33. By three or four times withdrawing a little of the contents through the cock 31 and pouring it back again through the funnel 32 and the cock 33, a uniform solution is very soon produced. A small air cock will facilitate this operation.

In apparatus of large size there is provided below the tank 30 a semi-rotary pump 34 which allows, by means of suitable piping, of rapidly mixing by a few strokes of the pump the contents of the soda tank, after the necessary quantity of soda has been poured into it, and of converting the said contents into a perfectly uniform liquid having the desired degree of concentration.

The operation of the decantation apparatus properly so called is as follows:

The siphon of the tank 17 assures at regular and frequent intervals the admission into the bell 22 of the water to be purified which drives out the air contained in the column 19 below the tank 17 and carries with it the reagents brought by the pipes 15 and 26.

These various elements are agitated energetically under the bell 22 in which the triple agitation takes place in the conditions hereinbefore referred to in connection with the saturator.

The water thus agitated rises through the tubes 23 in which the agitation is continued. This water then falls back between the tubes 23 and the wall 25 so as to pass under the said wall at the bottom of the decanting vessel and then rise over the whole cross sectional area of the latter. Reactions are thus assured in a very rapid manner and take place with maximum intensity.

The stirring-up underneath the reaction bell 22, agitates, together with the water, the precipitate that was previously formed and deposited upon the solid center 20' of the false bottom 20. This precipitate is of the same nature as that which has just been initiated in the liquid by the action of the reagents, and this agitation gives rise to a contact action having for its result a very rapid agglomeration of the precipitate and the immediate separation of the latter from the containing liquid.

Under these conditions as the liquid issues from the lower end of the tube 25 and enters the decanting vessel, the precipitate that has already collected, remains near the false bottom upon which it settles, while the water rises throughout its cross sectional area, passes up through the filter 28, and issues in a purified state from the pipe 29.

The improved purifier utilizes in the whole decanting operation two important phenomena, namely: first, the agitation of the water in the presence of air bubbles, whereby the reactions are promoted and intensified and second, the contact action of the formed precipitate upon the precipitate that is in course of formation, whereby an immediate agglomeration is assured.

The air escapes from the upper part of the apparatus, whereas the water issuing clear and purified from the pipe 29, overflows into the tank 40 whence it is led by the pipe 48 to the point of consumption.

The deposits of lime carbonate formed in the saturator are discharged through the discharge valve 5. The deposits produced by the precipitation in the decanting vessel, and retained on the false bottom of the latter, are flushed away by opening the valve 21 full once a day; since the total section of the apertures of the perforated false bottom is equal to that of the valve 21, a current will be produced between these apertures and the discharges which will carry off the deposits and flush out the bottom, thus keeping the decanting vessel in a state of cleanliness.

The emptying of the saturator should take place after 24 hours working, and should be performed while the apparatus is in operation. It should be followed by the introduction of the slaked lime.

In the constructional modification illustrated in Fig. 10, the bottom 20ᵃ″ of the decanting vessel is solid and has a conical shape. The flush is produced by means of a slide valve or lift valve 21ᵃ provided in the apex of the cone. The imperforate surface 20′ employed in the first hereindescribed constructional form at the middle of the perforated flat bottom 20 is replaced by a conical tray 20ᵃ′ coaxial with the decanting vessel. This tray has for its object to assure the maintenance of a permanent reserve of mud intended to ensure by emulsion the contact-action hereinbefore referred to.

If this tray were not provided, a reserve of mud would no doubt be formed but this reserve could not be permanent, since it would necessarily be carried away by the flushings.

The operation of the plant is as follows:

The raw water flows in a continuous manner into the tank 35. It is thence circulated, through the diaphragms 42, 44 and 46 of suitable diameter as above disclosed and through the conduits 43, 45 and 47 respectively into decantation apparatus 16, the lime water saturating device 1, and the tank containing carbonate of soda or like agent.

The raw water is supplied to the decantation apparatus 16 and the saturating device 1 in an intermittent manner and in the form of a violent flush, thus drawing forward the air in the form of an emulsion, due to the siphon devices which are disposed at the top of the said apparatus. At each operation of the siphon of the saturating device, a fresh quantity of lime water is admitted into the decantation apparatus, through the conduit 15. Further, the solution of carbonate of soda or other agent is supplied in a continuous manner to the decantation apparatus at a rate which corresponds to the rate of supply of the raw water through the conduit 47, by a simple displacement.

The water which is purified in the decantation apparatus as above disclosed is circulated through the upper part of the decantation apparatus into the tank 40, from which it is supplied to the places at which the water is utilized.

Having now described our invention, what we claim as new and desire to secure by Letters Patent is:—

1. A water purifier for effecting a water purification process with the use of lime water and another reagent such as carbonate of soda, comprising in combination, a crude water supply tank, a saturator in which the lime water is prepared, a tank in which the carbonate of soda or other reagent is prepared and a decanting device into which the prepared contents of said saturator and carbonate of soda tank are discharged, conduits connecting said crude water supply tank, said crude water supply tank having orifices controlling said conduits, said orifices having each an interchangeable inlet permitting the delivery of such quantities of water to said several receptacles in the same time, that the quantity delivered to the saturator and carbonate of soda tank will be just sufficient for the preparation of the proper quantity of the reagents to purify the quantity of crude water delivered to said decanting device, said saturator comprising a feeding siphon device, a receiver for receiving periodically a determined quantity of water for conversion into lime water, the frequency of said periods and the amount received at each period being determined by the operation of said siphon device, the latter being located above the saturator and being constructed to entrain a column of air between the successive liquid columns delivered by said siphon, said column of air being carried to the bottom of the saturator by the flow of liquid through said siphon, traversing the lime in said saturator and producing the turbulence required for effecting the saturation of the water with the lime, said purifier comprising also a lime tank, a central tube located in the saturator and opening near the bottom of the lime saturator, said tube communicating with the lime tank, each charge of lime being slaked in said tank during the utilization of the preceding charge in the saturator, an annular tray located at the upper part of said tube for receiving the saturated water, and a tube leading to the decanting device for carrying off the saturated water.

2. A water purifier for effecting a water purification process with the use of lime water and another reagent such as carbonate of soda, comprising intermittently operating lime water saturator and decanting devices in each of which the necessary agitation is produced solely by the action of violent and intermittent injections of liquid entrained air, a siphon device provided adjacent the upper end of the said saturator and decanting device, respectively, for entraining the air, a vertical tube positioned in the decanting device, in which tube occurs the agitation by the entrained air, the tube forming a separate zone in the liquid in said decanting device, the latter comprising a vessel, a perforated false bottom in said vessel, and a reaction bell resting on a solid central part of said false bottom, a tube opening into the interior of the vessel for receiving the reagents and the water to be purified and which is distributed to it by the operation of the said siphon device located adjacent the upper end of the decanting device, the said reaction bell being surmounted by emulsifying tubes, a circular plate supporting the emulsifying tubes, the tubes extending for a determined height and opening above the circular plate, the combined reaction bell, emulsifying tubes and plate being surrounded by a tube opening near the false bottom and extending through the entire height of the device, the upper part of the last said vessel comprising a filter, an outlet pipe feeding an overflow vessel, the purified water escaping through the outlet pipe.

3. A water purifier for effecting a water purification process with the use of lime water and another reagent, such as carbonate of soda, comprising a lime water saturator and a decanting device in each of which the necessary agitation is produced solely by the action of violent and intermittent injections of liquid entrained air, a siphon device provided adjacent the upper end of the said saturator and decanting device, respectively, for entraining the air, a vertical tube positioned in the decanting device, in which tube occurs the agitation by the entrained air, the tube forming a separate zone in the liquid in the decanting device from the zone where the decanting takes place, comprising a device for regulating a flow of water and the reagents comprising a supply-tank for receiving the water to be purified, a valve for controlling the inflow of water to be purified to said tank according to the output of the purifier, said valve being operated by a float located in said tank and being also operated when the output of the purifier is less than the normal output, by a float located in an overflow vessel with three orifices which respectively assure a constant inflow of water to be purified on its way to the decanting device, a constant inflow of the water to be converted into lime water in the saturator, and a constant inflow of the water whose inflow into the tank containing a solution of said second reagent, causing a displacement of an equal volume of the solution of this reagent deliver the latter volume into said decanting device, the pressure upon the three diaphragms always being the same, whereby to assure the constancy of their outflows.

In testimony whereof we have signed our names.

JEAN BAPTISTE GAIL.
NOËL ADAM.